US010871069B2

(12) United States Patent
Adebiyi (10) Patent No.: US 10,871,069 B2
(45) Date of Patent: Dec. 22, 2020

(54) FLOW TESTING WELLBORES WHILE DRILLING (71) Applicant: Saudi Arabian Oil Company, Dhahran (SA)

(72) Inventor: Ismail Adebiyi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 6 days.

(21) Appl. No.: 16/239,366

(22) Filed: Jan. 3, 2019

(65) Prior Publication Data

US 2020/0217197 A1 Jul. 9, 2020

(51) Int. Cl.
*E21B 49/08* (2006.01)
*E21B 33/127* (2006.01)
*E21B 34/06* (2006.01)
*E21B 47/06* (2012.01)
*E21B 47/07* (2012.01)
(Continued)

(52) U.S. Cl.
CPC .......... *E21B 49/081* (2013.01); *E21B 33/127* (2013.01); *E21B 34/06* (2013.01); *E21B 49/084* (2013.01); *E21B 47/06* (2013.01); *E21B 47/07* (2020.05); *E21B 47/10* (2013.01);
(Continued)

(58) Field of Classification Search
CPC .. E21B 49/08–10; E21B 34/06; E21B 34/007; E21B 33/127; E21B 33/1243; E21B 33/124; E21B 47/065; E21B 47/06; E21B 47/10; E21B 47/18; E21B 47/12; E21B 47/122; E21B 2034/007; E21B 2034/002;
(Continued)

(56) References Cited

U.S. PATENT DOCUMENTS 2,043,225 A * 6/1936 Armentrout .......... E21B 49/087
166/264
2,227,729 A 1/1941 Lynes
(Continued)

FOREIGN PATENT DOCUMENTS

CA 2249432 9/2005
CA 2594042 8/2012
(Continued)

OTHER PUBLICATIONS

Schlumberger, "Certis: Retrievable, single-trip, production-level isolation system," www.slb.com/CERTIS, 2017, 2 pages.
(Continued)

*Primary Examiner* — George S Gray
(74) *Attorney, Agent, or Firm* — Fish & Richardson P.C.

(57) ABSTRACT

A well testing tool mounted on a drill string is positioned within a zone of interest in a wellbore. An RFID tag with a density between 400 and 500 pounds per square foot is dropped through the drill string to activate the well testing tool. An uphole packer positioned at an uphole end of the well testing tool and a downhole packer positioned at a downhole end of the well testing tool are expanded to isolate a portion of the zone of interest between the expanded uphole packer and the expanded downhole packer. A three-way valve positioned between the uphole packer and the downhole packer is adjusted to allow fluid to flow from the isolated portion of the zone of interest into the drill string. One or more sensors within the well testing tool are activated.

19 Claims, 9 Drawing Sheets (51) Int. Cl.
*E21B 47/10* (2012.01)
*E21B 47/18* (2012.01)
*G06K 19/07* (2006.01)

(52) U.S. Cl.
CPC ............ *E21B 47/18* (2013.01); *E21B 2200/04* (2020.05); *E21B 2200/06* (2020.05); *G06K 19/0723* (2013.01)

(58) Field of Classification Search
CPC .. E21B 47/103; E21B 47/138; E21B 2200/06; E21B 2200/07; G06K 19/0723
See application file for complete search history.

(56) References Cited

U.S. PATENT DOCUMENTS

| | | | |
|---|---|---|---|
| RE32,345 E | 3/1987 | Wood | |
| 5,803,186 A | 9/1998 | Berger et al. | |
| 6,047,239 A * | 4/2000 | Berger | E21B 21/103 |
| | | | 702/12 |
| 6,330,913 B1 | 12/2001 | Langseth et al. | |
| 6,622,554 B2 | 9/2003 | Manke et al. | |
| 7,086,463 B2 | 8/2006 | Ringgenberg et al. | |
| 7,124,819 B2 | 10/2006 | Ciglenec et al. | |
| 7,647,980 B2 | 1/2010 | Corre et al. | |
| 9,051,810 B1 * | 6/2015 | Cuffe | E21B 34/066 |
| 9,238,961 B2 | 1/2016 | Bedouet | |
| 9,494,010 B2 | 11/2016 | Flores | |
| 2002/0066563 A1 | 6/2002 | Langseth et al. | |
| 2005/0022987 A1 | 2/2005 | Green et al. | |
| 2006/0248949 A1 * | 11/2006 | Gregory | E21B 49/088 |
| | | | 73/152.51 |
| 2008/0053652 A1 | 3/2008 | Corre et al. | |
| 2010/0006339 A1 | 1/2010 | Desai | |
| 2011/0155368 A1 | 6/2011 | El-Khazindar | |
| 2014/0300895 A1 | 10/2014 | Pope et al. | |
| 2015/0027724 A1 * | 1/2015 | Symms | E21B 33/1243 |
| | | | 166/373 |

FOREIGN PATENT DOCUMENTS

| | | |
|---|---|---|
| WO | 9721904 | 6/1997 |
| WO | 02/20944 | 3/2002 |
| WO | 2017196303 | 11/2017 |

OTHER PUBLICATIONS

Weatherford, "RFID Advanced Reservoir Management System Optimizes Injection Well Design, Improves Reservoir Management," Weatherford.com, 2013, 2 pages.

Wellbore Service Tools: Retrievable tools, "RTTS Packer," Halliburton: Completion Tools, 2017, 4 pages.

International Search Report and Written Opinion issued in International Application No. PCT/US2019/067852 dated Mar. 25, 2020, 15 pages.

PCT Invitation to Pay Additional Fees and, Where Applicable, Protest Fee issued in International Application No. PCT/US2020/015215 on Jun. 9, 2020, 19 pages.

PCT International Search Report and Written Opinion in International Application No. PCT/US2020/015215, dated Jul. 31, 2020, 23 pages.

* cited by examiner

FLOW TESTING WELLBORES WHILE DRILLING

TECHNICAL FIELD

This disclosure relates to flow testing geologic formations during drilling operations without pulling the drill string from the wellbore.

BACKGROUND

In hydrocarbon production, wellbores are formed in geologic formations through zones of interest that have a potential for hydrocarbon production. After a wellbore has been formed through a zone of interest, the drill string is pulled out of the wellbore, and a testing string is inserted to isolate the zone of interest. At a topside facility, various testing equipment is installed to flow production fluid and make assessments on the viability of the zone of interest. After tests are concluded, the test string is pulled from the wellbore, and the drill string is reinserted into the wellbore. Drilling is then resumed to the next zone of interest within the geologic formation.

SUMMARY

This disclosure describes technologies relating to flow testing wellbores while drilling.

An example implementation of the subject matter described within this disclosure is a method with the following features. A well testing tool mounted on a drill string is positioned within a zone of interest in a wellbore. An RFID tag with a density between 400 and 500 pounds per square foot is dropped through the drill string to activate the well testing tool. An uphole packer positioned at an uphole end of the well testing tool and a downhole packer positioned at a downhole end of the well testing tool are expanded to isolate a portion of the zone of interest between the expanded uphole packer and the expanded downhole packer. A three-way valve positioned between the uphole packer and the downhole packer is adjusted to allow fluid to flow from the isolated portion of the zone of interest into the drill string. One or more sensors within the well testing tool are activated.

Aspects of the example implementation, which can be combined with the example implementation alone or in combination, include the following. Production fluid is flowed from the zone of interest, through the well testing tool, and up the drill string. Dynamic data is recorded with the one or more sensors.

Aspects of the example implementation, which can be combined with the example implementation alone or in combination, include the following. Recording dynamic data with one or more sensors includes recording pressure, temperature, or flow-rate.

Aspects of the example implementation, which can be combined with the example implementation alone or in combination, include the following. The dynamic data is relayed in real-time to a topside facility.

Aspects of the example implementation, which can be combined with the example implementation alone or in combination, include the following. The production fluid is flowed to a topside facility. Fluid properties are measured at the topside facility.

Aspects of the example implementation, which can be combined with the example implementation alone or in combination, include the following. Circulation fluid is circulated prior to flowing production fluid. The circulation fluid is of a weight for a desired drawdown rate or underbalanced condition.

Aspects of the example implementation, which can be combined with the example implementation alone or in combination, include the following. a second weighted RFID chip is dropped through the drill string to activate a shut-in mode of the well testing tool. Dynamic data is recorded with the one or more sensors.

Aspects of the example implementation, which can be combined with the example implementation alone or in combination, include the following. A third weighted RFID chip is dropped through the drill string to deactivate the well testing tool.

Aspects of the example implementation, which can be combined with the example implementation alone or in combination, include the following. A next zone of interest is drilled to without tripping the well testing tool out of the wellbore.

Aspects of the example implementation, which can be combined with the example implementation alone or in combination, include the following. The uphole packer is a full-bore packer.

An example implementation of the subject matter described within this disclosure is a downhole-type well testing tool with the following features. An uphole packer is positioned at an uphole end of the tool. A downhole packer is positioned at a downhole end of the tool. One or more sensors are positioned between the uphole packer and the downhole packer. A three-way valve is positioned between the uphole and downhole packer.

Aspects of the example implementation, which can be combined with the example implementation alone or in combination, include the following. An upper circulation valve is positioned uphole of the uphole packer.

Aspects of the example implementation, which can be combined with the example implementation alone or in combination, include the following. The uphole packer includes an inflatable bladder. A retractable protective sleeve surrounds the inflatable bladder. A pump fluidically is coupled to a fluid reservoir and the inflatable bladder. The pump is configured to flow fluid from the reservoir into the inflatable bladder.

Aspects of the example implementation, which can be combined with the example implementation alone or in combination, include the following. The three-way valve includes a ball valve, positioned within a central flow path of the well testing tool, and a retractable sleeve positioned downhole of the ball valve. The sleeve surrounds fluid ports.

Aspects of the example implementation, which can be combined with the example implementation alone or in combination, include the following. The three-way valve has an inflow mode in which the three-way valve fluidically connects a zone of interest to central flow path of the well testing tool. A circulating mode, in which the three-way valve fluidically connects an uphole end of the tool to a downhole end of the tool, is also included. A shut-in mode, in which the three-way valve fluidically isolates the wellbore from the central flow path of the well testing tool, is also included.

Aspects of the example implementation, which can be combined with the example implementation alone or in combination, include the following. The one or more sensors include a pressure sensor a flow meter, and a temperature sensor.

Aspects of the example implementation, which can be combined with the example implementation alone or in combination, include the following. A communication module is configured to relay data collected by the one or more sensors to a topside facility in real-time.

Aspects of the example implementation, which can be combined with the example implementation alone or in combination, include the following. A controller includes one or more processors, and a non-transitory computer-readable storage medium coupled to the one or more processors and storing programming instructions for execution by the one or more processors. The programming instructions instruct the one or more processors to detect a weighted RFID tag. The programming instructions instruct the one or more processors to set a state of the uphole packer and the downhole packer. The programming instructions instruct the one or more processors to set a mode of the three-way valve.

An example implementation of the subject matter described within this disclosure is a drill string with the following features. A drill bit is at a downhole end of the drill string. A downhole-type well testing tool is uphole of the drill bit. The downhole-type well testing tool includes an uphole packer positioned at an uphole end of the tool. A downhole packer is positioned at a downhole end of the tool. One or more sensors are positioned between the uphole packer and the downhole packer. A three-way valve is positioned between the uphole and downhole packer. The three-way valve is configurable to be in three valve states. An upper circulation valve is positioned uphole of the uphole packer. The upper circulation valve is configurable to be in an open or closed state.

Aspects of the example implementation, which can be combined with the example implementation alone or in combination, include the following. A controller with one or more processors, and a non-transitory computer-readable storage medium coupled to the one or more processors and storing programming instructions for execution by the one or more processors. The programming instructions instruct the one or more processors to detect a weighted RFID tag. The programming instructions instruct the one or more processors to set a state of the uphole packer and the downhole packer in response to the detected RFID tag. The programming instructions instruct the one or more processors to set a mode of the three-way valve.

Aspects of the example implementation, which can be combined with the example implementation alone or in combination, include the following. The programming instructions further instruct the one or more processors to open or close the upper circulation valve.

Aspects of the example implementation, which can be combined with the example implementation alone or in combination, include the following. A state of the uphole packer and the downhole packer can include an activated state, the state being changed in response to a presence of a first RFID tag.

Aspects of the example implementation, which can be combined with the example implementation alone or in combination, include the following. A mode of the three-way valve is changed in response to a presence of a second RFID tag different than the first RFID tag.

Particular implementations of the subject matter described in this disclosure can be implemented so as to realize one or more of the following advantages. The ability to flow test wellbores without re-tripping in and out of the hole save days of drilling time. Safety is improved by reducing the work load and exposure to drilling fluids. Furthermore, testing right after drilling through gives more accurate evaluation of the reservoir because formation damage tends to occur with prolonged exposure to drilling fluids.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to a downhole-type well testing tool that can be included on a bottom hole assembly (BHA) of a drill string. The downhole-type well testing tool includes an uphole packer and a downhole packer that are housed within the tool until needed so that they are not damaged during drilling operations. The packers are only deployed for testing operations. When deployed, the packers isolate a section within a zone of interest in the wellbore. The tool also has a three-way valve module that has a variety of flow modes. In one flow mode, the valve directs fluid from the isolated section of the zone of interest toward a topside facility for testing. The downhole-type well testing tool measures various parameters of the flowing fluid in-situ and sends the data to the topside facility in real-time. Once sufficient tests have been completed, the downhole-type testing tool retracts the packers and changes a flow mode of the three-way valve to allow for drilling to continue. The well testing can be done without taking the drill string out of the wellbore. Eliminating such a step can save several days in well testing and drilling time.

The system can be activated, deactivated, or has its mode of operation altered in response to weighted radio frequency identification (RFID) tags passing by an RFID sensor on the tool. The RFID tags are weighted sufficiently to sink down the drill string without the need to circulate fluid. As RFID tags are programmable, this allows for smart and selective tool functioning. As such this tool is not as easily affected by wellbore conditions and related challenges, such as pressure fluctuations and limitation in transmissibility in mud.

Figure 1:
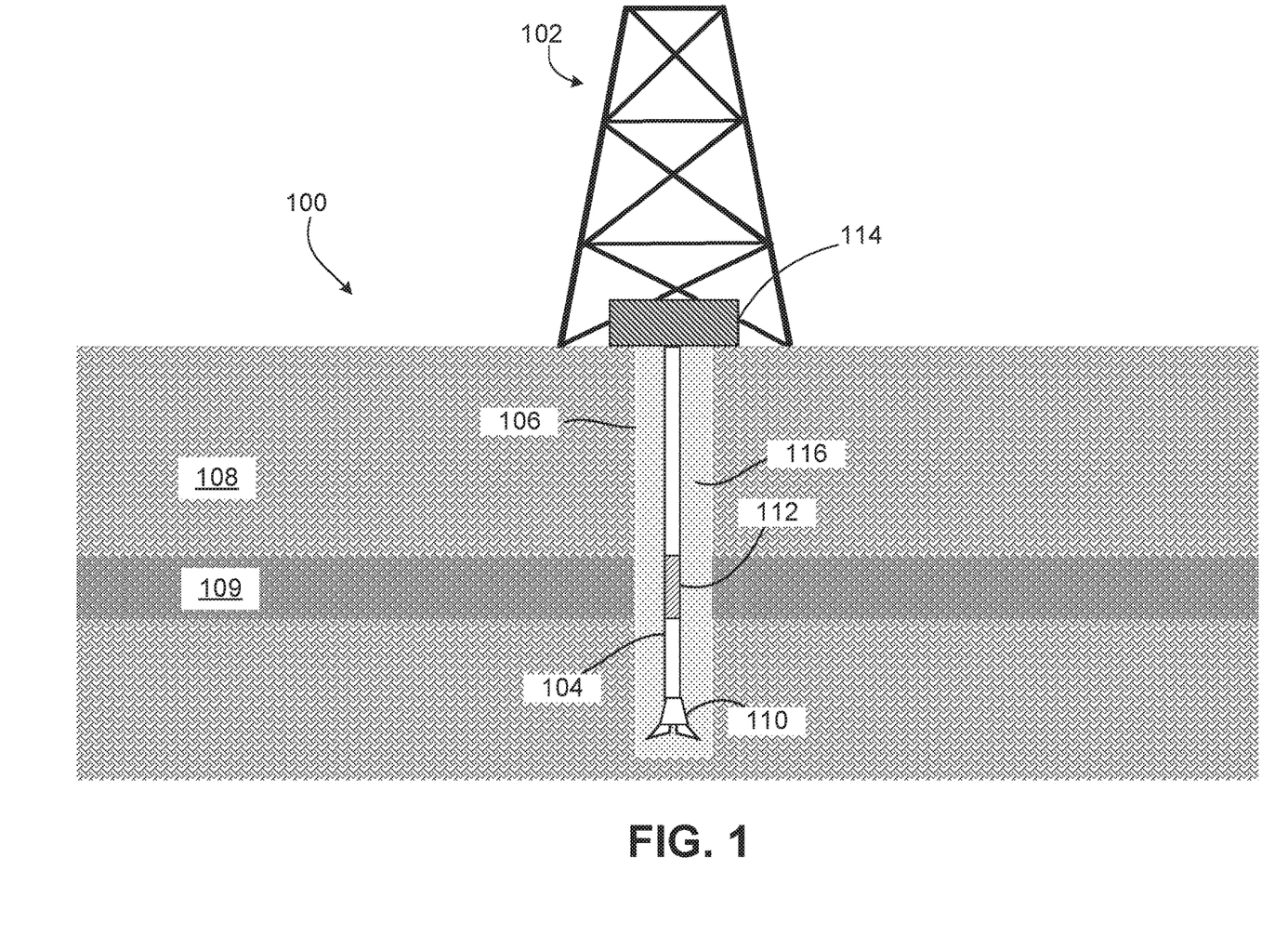
FIG. 1 is a schematic diagram of a drilling site.

FIG. 1 is a schematic diagram of a drilling site 100. The site 100 includes a drill derrick 102 that supports a drill string 104 as it forms a wellbore 106 in a geologic formation 108. In particular, the wellbore 106 is formed such that it passes through a zone of interest 109. In some instances, the zone of interest 109 has a potential for hydrocarbon production. The drill string 104 includes a drill bit 110 at a downhole end of the drill string 104. Uphole of the drill bit 110 is a well testing tool 112 that is capable of performing active reservoir tests and is rugged enough to be included on an active drill string. The well testing tool 112 is described in greater detail later in this disclosure. During drilling operations, fluid is circulated from the topside facility 114, down the drill string, and up an annulus 116 of the wellbore 106. The annulus 116 is defined by the gap between the outer surface of the drill string 104 and the wall of the wellbore 106. The topside facility 114 includes other ancillary equipment needed for drilling operations, such as pumps, shaker tables, separators, and/or flaring equipment. In general, the system as described is appropriate for a vertical or near vertical wellbore. For example, an inclination of up to thirty degrees from vertical are appropriate for the described system.

Figure 2:
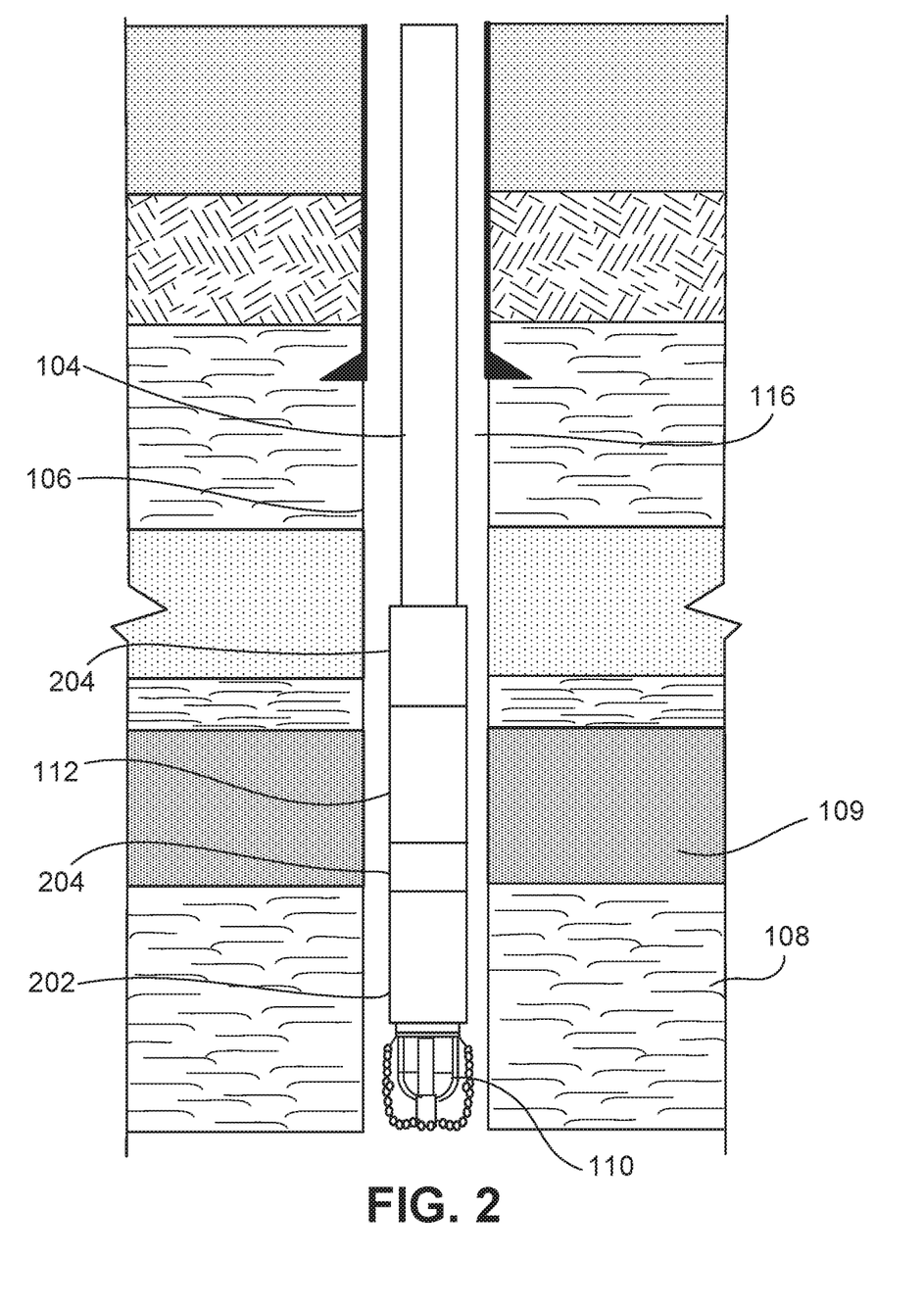
FIG. 2 is a schematic diagram of a well testing tool on a drill string.

FIG. 2 is a schematic diagram of the well testing tool 112 on the drill string 104. The drill bit 110 is positioned at the downhole end of the drill string 104. The drill string 104 includes a mud motor 202 uphole of the drill bit 110. The mud motor 202 increases a rate of rotation of the drill bit 110 compared to the rest of the drill string 104, resulting in a faster rate of penetration into the geologic formation 108. Mud motors are typically used but are not required.

The drill string also includes two drill collars 204. The drill collars 204 are thick-walled portions of the drill string 104 that add additional weight to the drill bit 110 during drilling operations. The drill string 104 includes the drill collars 204 at an uphole end of the well testing tool 112 and the drill collars 204 at a downhole end of the well testing tool 112. Some drill strings include more or fewer drill collars 204. The drill collars 204, when used, can be located at other locations along the drill string 104.

Figure 3:
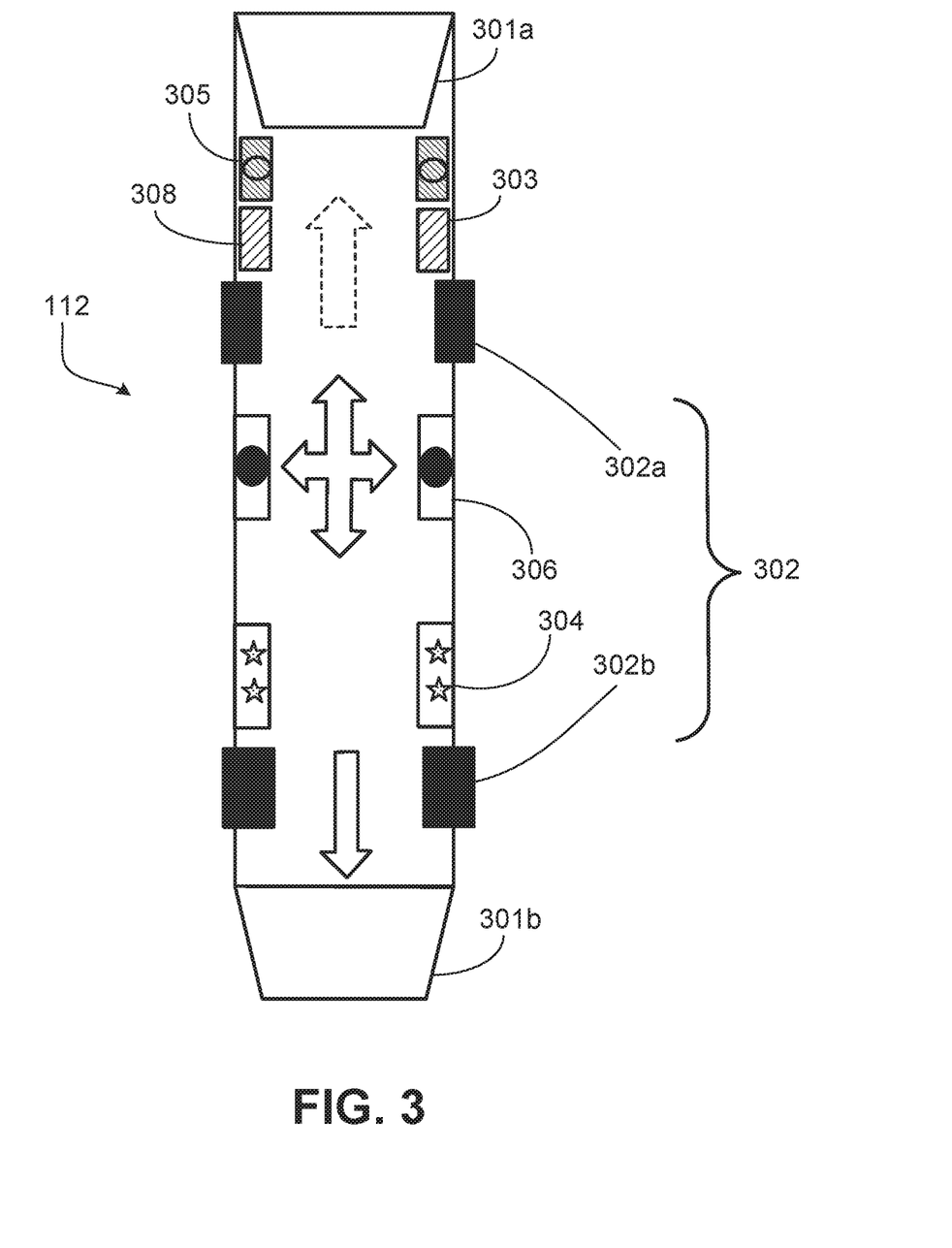
FIG. 3 is a schematic diagram of the well testing tool.

FIG. 3 is a schematic diagram of the well testing tool 112. The well testing tool 112 is connected to other components of the drill string 104 by a first threaded connection 301a at an uphole end of the well testing tool 112 and a second threaded connection 301b at a downhole end of the well testing tool 112. While shown with threaded connections, other connections suitable for drilling conditions, and which can satisfy the mechanical requirements and performance windows, can be used.

The well testing tool 112 includes an uphole packer 302a positioned at an uphole end of the well testing tool 112 and a downhole packer 302b positioned at a downhole end of the well testing tool 112. The packers 302 are configured to isolate a section of the annulus between the uphole packer 302a and the downhole packer 302b. The packers 302 themselves are ruggedized to handle the abrasion and vibration that can occur from being mounted on a rotating drill string 104. The packers 302 are described in more detail later in this disclosure. Uphole of the uphole packer 302a is an upper circulation valve 305 that can be used to isolate the well testing tool 112 from a remainder of the string. The upper circulation valve 305 can include a ball valve, a flapper valve, or any other valve appropriate for high pressure circulation and production fluids.

One or more sensors 304 are positioned between the uphole packer 302a and the downhole packer 302b. The well testing tool 112 includes a pressure sensor, a flow meter, and a temperature sensor. Some well testing tools include fewer sensors, more sensors, or different sensors In general, sensors useful for in situ well testing are include on the well testing tool 112. The sensors and other downhole electronics can be powered by a battery encased within the well testing tool 112, a downhole generator, power supplied from the topside facility, other power supplies or a combination of these power supplies. To maintain sensor reliability through vibrations encountered while drilling, the sensors will be ruggedized and put in "sleep mode" when not in use. The downhole electronic components are described in more detail later in this disclosure.

A three-way valve 306 is positioned between the uphole packer 302a and the downhole packer 302b. The three-way valve is configured with a variety of flow modes and can switch between the flow-modes during drilling and testing operations. The flow modes include a testing mode, a shut-in mode, and a circulation mode. Some well testing tools include other valve arrangements. The three-way valve 306 and its modes of operation are described in more detail later in this disclosure.

The well testing tool 112 also includes a communication module 308 operable to relay data collected by the one or more sensors 304 to a topside facility in real-time. Real-time in the context of this disclosure can include a transmission and processing delay of up to a few minutes. The real-time communication system is capable of transferring data from the well testing tool 112 to the topside facility without removing the tool out of the wellbore 106. The communications module 308 uses radio waves to trigger tool functions and mud pulses to communicate with the topside facility 114. Some communication modules use other approaches such as, for example, mud-pulses or electrical communication over a solid conductor to the surface instead of or in addition to radio waves.

Figure 4A:
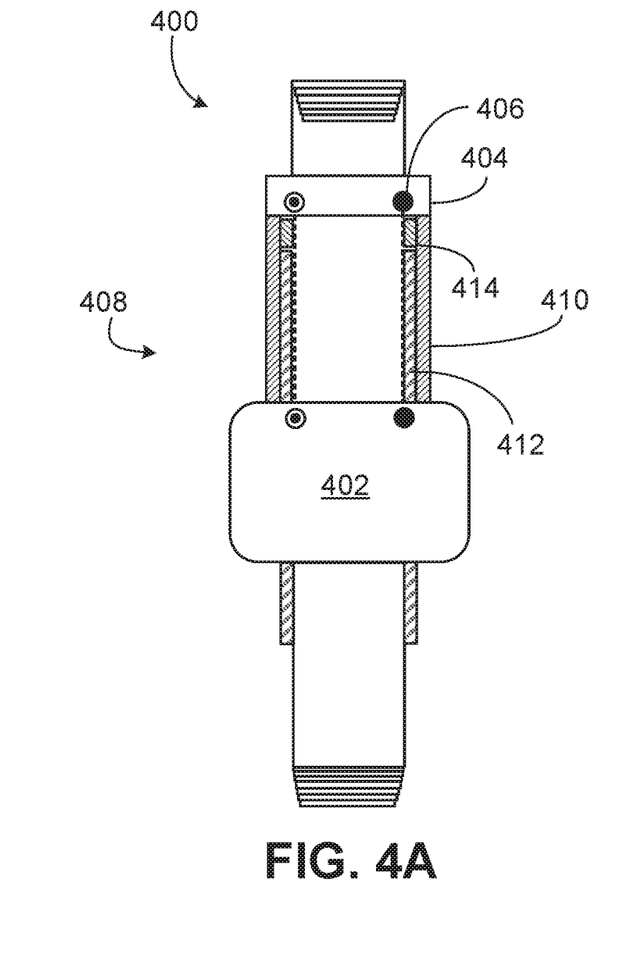
FIGS. 4A-4B are schematic diagrams of a packer assembly that can be used as part of the well testing tool.
Figure 4B:
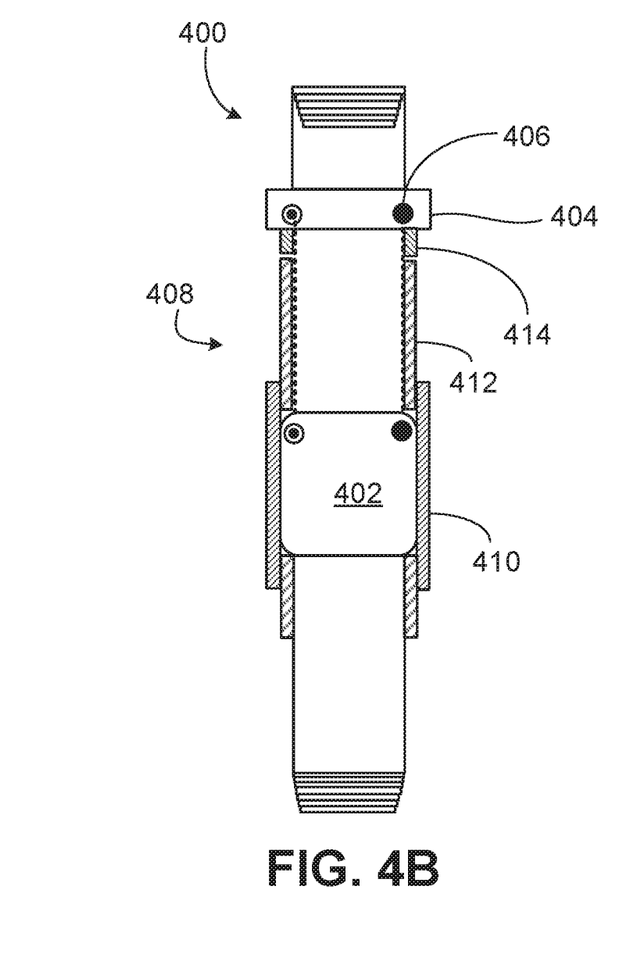
Figure 5:
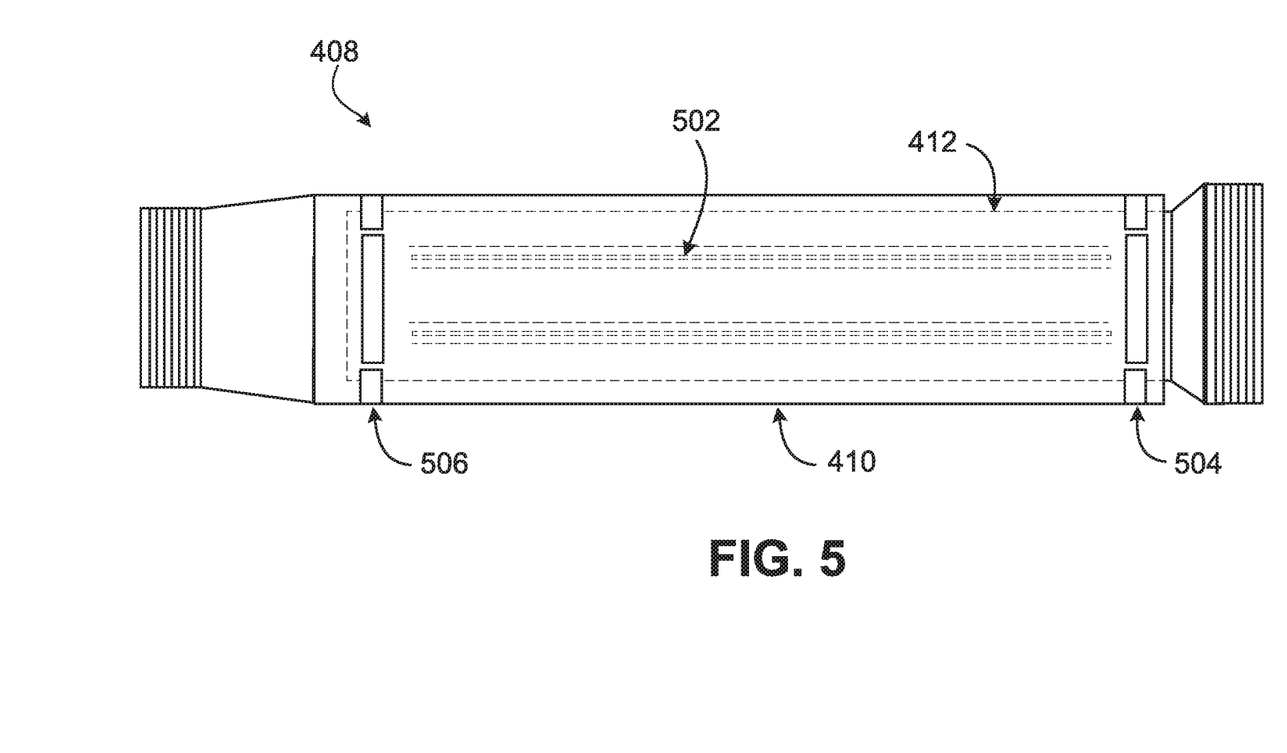
FIG. 5 is a schematic diagram of an adjustable mandrel that can be used as part of the well testing tool.

FIGS. 4A-4B are schematic diagrams of a packer assembly 400. FIG. 5 is a schematic diagram of an adjustable mandrel assembly. FIGS. 6A-6D are schematic diagrams of a dual valve circulating device. The well testing tool 112 shown in FIG. 3, incorporates the packer assemblies, the dual valve circulating device, and the sensors into a single sub-assembly. However, these components of the testing tool configured as separate sub-assemblies as shown in FIGS. 4A-6D that are assembled together as part of the drill string.

FIGS. 4A-4B are schematic diagrams of a packer assembly 400 that can be used with the well testing tool 112. In particular, the packer assembly 400 can be used as the uphole packer 302a, the downhole packer 302b, or both. The packer assembly 400 includes an inflatable bladder 402. The inflatable bladder 402 is fluidically connected to a fluid reservoir 404 by a pump 406. When activated, the pump 406 pumps fluid from the fluid reservoir 404 to the inflatable bladder 402, causing the inflatable bladder 402 to inflate. In some implementations, the pump 406 can be reversed and pump fluid from the inflatable bladder 402 to the fluid reservoir 404 when the packer is deactivated. In some implementations, a valve is opened between the fluid reservoir 404 and the inflatable bladder 402, allowing fluid to flow from the inflatable bladder 402 to the fluid reservoir 404, bypassing the pump. Such implementations use the pressure caused by the elasticity of the inflatable bladder to provide pressure for the fluid flow. In some implementations, the pump 406, the reservoir 404, or both, can supply fluid to multiple inflatable bladders 402. For example, a single pump 406 and a single reservoir 404 can supply fluid to both the uphole packer 302a and the downhole packer 302b (see FIG. 3). The packer assemblies 400 are full-bore packers. That is, the packer fully expands to seal (that is, fully seal or partially seal) the entire annulus 116 (see FIGS. 1-2). The pump 406 and other downhole electronics can be powered by a battery encased within the well testing tool 112, a downhole generator, power supplied from the topside facility 114, other power supplies or a combination of these power supplies.

In contrast to this approach, measurement-while-drilling (MWD) and logging-while-drilling (LWD) BHAs use pad-based packers that have extendable arms that latch against the formation. Although the pad-based packers can be used on MWD/LWD BHAs because these tools have a limited application in collecting small volume samples, the pad-based packers cannot be used for well testing that involves continuous flow of reservoir fluids to surface. Full bore packers have not been used in drilling BHAs because of the likelihood the full-bore packers would be damaged during drilling operations. This system preserves the life of the full bore packers while drilling by using a protective sleeve on the packers.

A retractable protective sleeve assembly 408 protects the inflatable bladder 402 during drilling operations. The protective sleeve assembly includes an outer mandrel 410 that surrounds the inflatable bladder 402 when the inflatable bladder 402 is in the deactivated state. The outer mandrel 410 protects the inflatable bladder 402 from abrasion against the wall of the wellbore 106 during drilling operations. When the well testing tool is activated, the outer mandrel 410 retracts to allow the inflatable bladder 402 to expand. Once the inflatable bladder 402 has deflated, the outer mandrel 410 slides to protect the inflatable bladder 402 for continuing drilling operations. The outer mandrel 410 slides atop an inner mandrel 412. Further details on the interactions between the inner mandrel 412 and the outer mandrel 410 are described later in this disclosure.

In some implementations, the RFID sensor 414 is integrated into the packer assembly 400. The RFID sensor 414 can detect an RFID tag passing through the drill string. The packer assembly 400 can be activated and deactivated in response to the RFID tag passing by the sensors. The RFID sensor 414 and other downhole electronics can be powered by a battery encased within the well testing tool 112, a downhole generator, power supplied from the topside facility 114, or any combination. Operations in response to an RIFD tag are described in more detail later in this disclosure.

FIG. 5 is a schematic diagram of an adjustable mandrel assembly that can be incorporated in well testing tools. For example, the mandrel assembly can be used as the sleeve assembly 408 within the packer assembly 400. The sleeve assembly 408 has an outer mandrel 410 that can axially slide between and "open" position 504 and "closed" position 506. The positions are binary in that the mandrel is only lockable in an "open" position 504 and a "closed" position 506. The mandrel is placed in its open position to increase the distance between the packers. The mandrel is guided by an inner mandrel 412 with splines 502 to prevent rotation. The mandrel assembly can also be implemented as an independent sub-assembly. In operation, an RFID tag is used to initiate an actuation of the mandrel assembly. A sensor in the mandrel assembly detects the signal, and a motor is activated in response to the detected signal. The motor slides the mandrel to move the mandrel between the "open" position 504 and a "closed" position 506. In some implementations, the mandrel can travel substantially ten feet (plus or minus two feet) when moving between the "open" position 504 and a "closed" position 506. In some implementations, the actuation mechanism is separate and distinct from the actuation mechanism of the three-way valve.

Figure 6A:
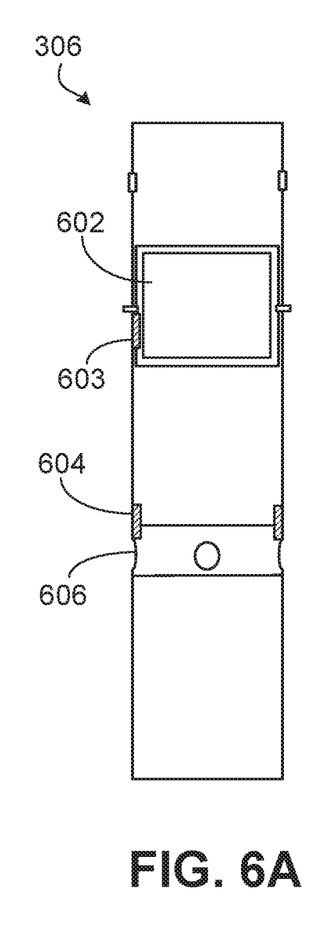
FIGS. 6A-6D are schematic diagrams of a dual valve circulating device that can be used as part of the well testing tool.

FIGS. 6A-6D are schematic diagrams of a dual valve circulating device that can be used to place the well testing tool 112 in various modes of operation. In particular, the dual valve circulating device can be used as the three-way valve 306. FIG. 6A is a schematic diagram of the three-way valve 306. The three-way valve 306 includes a ball valve 602 positioned within a central flow path of the well testing tool 112. The ball valve is mechanically coupled to an electric actuator 603 that changes positions in response to signals from an RFID tag. The electric actuator 603 and other downhole electronics can be powered by a battery encased within the well testing tool 112, a downhole generator, power supplied from the topside facility 114, other power supplies or a combination of these power supplies. The three-way valve 306 can include a separate RFID sensor, or it can be coupled to the RFID sensor located within the packer assembly 400 (see FIG. 4).

A retractable sleeve 604 is positioned downhole of the ball valve. The sleeve surrounds several fluid ports 606. When activated, the sleeve 604 retracts, allowing fluid to flow through the ports 606. When deactivated, the sleeve 604 covers the ports 606, preventing flow. In operation, an RFID tag is used to initiate an actuation of the sleeve 604. A sensor in assembly detects the signal, and a motor is activated in response to the detected signal. The motor slides the sleeve 604 to move to a desired position. In some implementations, the sleeve can travel substantially six to twelve inches when moving between an "open" position and a "closed" position. In some implementations, the actuation mechanism is separate and distinct from the actuation mechanism of the mandrel assembly.

Figure 6B:
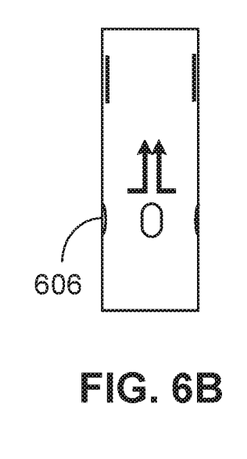

The three-way valve has three modes. FIG. 6B shows the three-way valve 306 in an in-flow, or testing, mode in which the three-way valve fluidically connects a zone of interest to a central flow path of the well testing tool. This is done by retracting the sleeve 604 and opening the ball valve 602. This arrangement allows fluid to flow from the zone of interest, through the fluid ports, and up the drill string to a topside facility. This mode is used during testing operations.

Figure 6C:
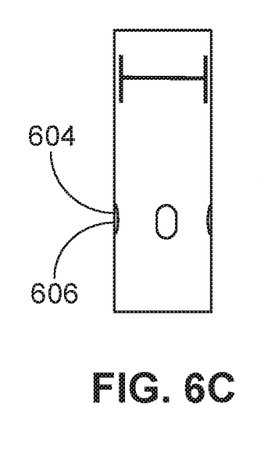

FIG. 6C shows the three-way valve 306 in a shut-in mode in which the three-way valve fluidically isolates the wellbore from the central flow path of the well testing tool. This is done by both extending the sleeve 604 and shutting the ball valve 602. Such an arrangement prevents fluid to flow from the zone of interest. This mode is used during testing operations to measure pressure recovery rates.

Figure 6D:
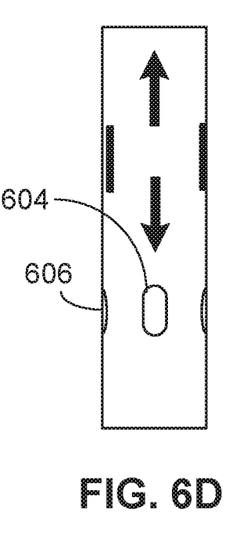

FIG. 6D shows the three-way valve 306 in a circulating, or dormant mode in which the ball valve 602 is in the open position while the sleeve 604 is extended. The circulating mode can be used during standard drilling and circulating operations.

The three-way valve 306 can be used during drilling operations. In contrast, valves are activated by hydraulic pressure cannot be used while drilling because applying the necessary pressure during drilling an open hole will cause fluid losses resulting in drilling problems. The three-way valve 306 is activated, for example, by a battery powered motor which will be in "sleep mode" while drilling and until it is needed to operate rather requiring pumping or hydraulic pressure to activate.

The system is activated, deactivated, or has its mode of operation altered in response to a weighted radio frequency identification (RFID) tag passing by an RFID sensor on the tool. In some implementations, different RFID tags can instruct the system to change modes. In some implementations, each RFID tag is substantially identical, and a mode of operation of the well testing tool is cycled each time an RFID tag passes by the RFID sensor.

Figure 7A:
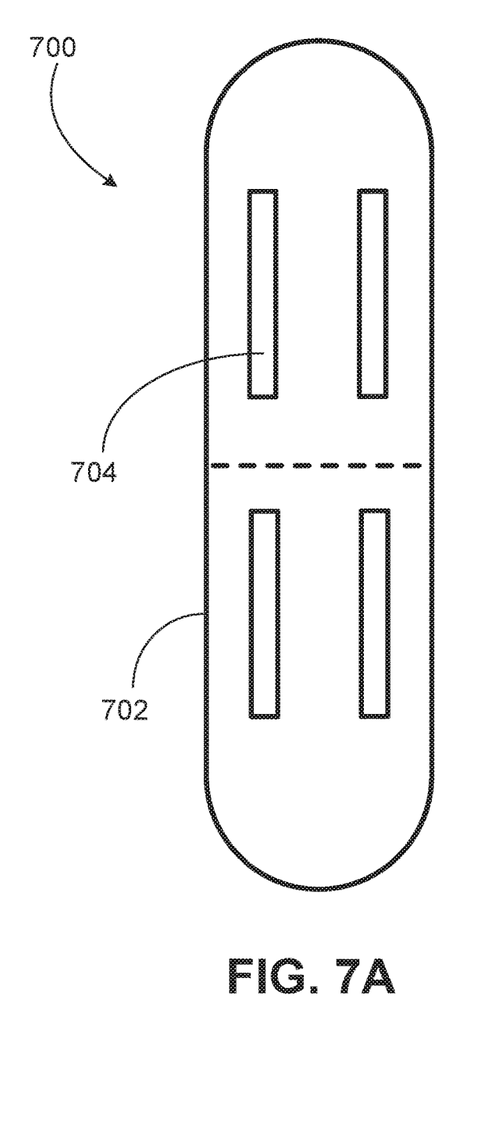
FIG. 7A-7B are schematic diagrams of a RFID tag with an external view and an interior view.
Figure 7B:
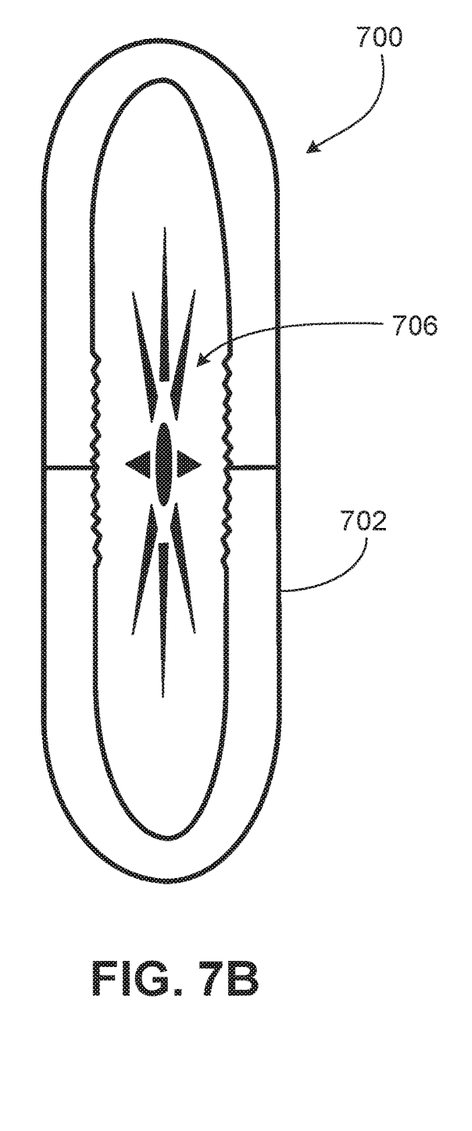

FIGS. 7A-7B show an RFID tag 700 exterior and interior views. The RFID tag is weighted sufficiently to sink down the drill string without the need to circulate fluid. In general, the RFID tag has a greater density than fluid in the drill string. In some instances, hydrodynamic shapes are used to increase a sinking rate. The RFID tag 700 includes a metal housing 702 with one or more windows 704 to allow RFID signals to pass through the housing 702. The window 704 can include glass, plastic, or any other material that allows the RFID signal to pass through the housing with little to no attenuation. In some implementations, the housing 702 can include two halve that are threaded together. The two halve of the housing 702 define an interior space that retains and protects the RFID chip 706 within the housing 702. In contrast to applications which use RFID tags carried by the drilling fluid, the shape and density of these RFID tags allow them to be deployed by gravity (for example, these RFIDS tags fall through fluid in the hole to the down-hole equipment being controlled by the RFID tags). The RFID tags can have a density between four hundred to five hundred pounds per cubic foot. Drilling fluids typically have a density of sixty-four to one hundred pounds per cubic foot.

Figure 8:
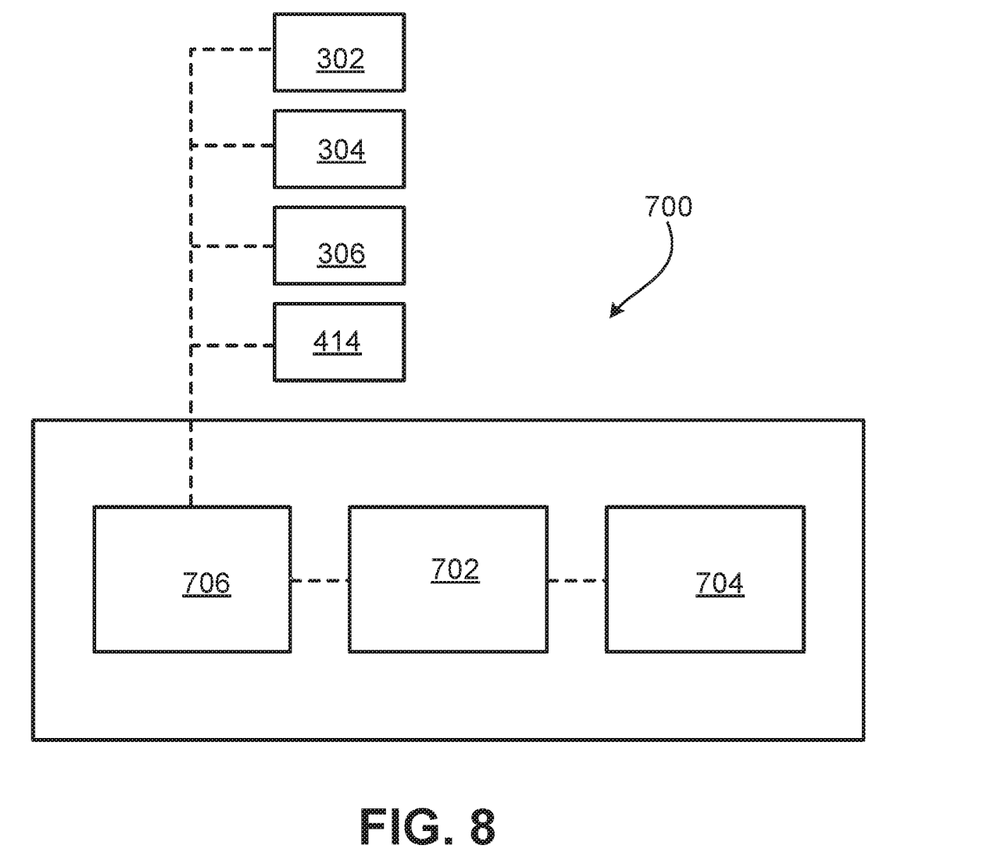
FIG. 8 is a block diagram of a controller that can be used with a well testing tool.

FIG. 8 is a block diagram of a controller 700 that can be used with aspects of the downhole-type well testing tool 112. The controller 700 can include one or more processors 702 and non-transitory memory 704 containing instructions to facilitate sending and receiving signals through an input/output (I/O) interface 706. The controller 700 can communicate with components of the well testing tool 112 (see FIG. 3) such as, for example, the packers 302, the one or more sensors 304, the three-way valve 306, the RFID sensor 414, other components or combination of these components. In some implementations, the controller 700 is entirely located at the topside facility 114. In some implementations, the controller 700 is located within the wellbore 106 such as, for example, within the well testing tool 112. In some implementations, the controller 700 is a distributed controller. For example, a portion of the controller 700 can be located within the well testing tool 112, while another portion of the controller 700 can be located at the topside facility 114.

The present disclosure is also directed to a method of monitoring, controlling, and using the well testing tool 112. To monitor and control the well testing tool, the controller 700 is used in conjunction with the one or more sensors (such as flow meters, pressure sensors, temperature sensors, RFID sensors, etc.) to measure parameters of the production fluid and the downhole-type well testing tool 112 at various positions within the wellbore 106 and the downhole-type well testing tool 112. Input and output signals, including the data from the sensors controlled and monitored by the controller 700, can be logged continuously by the controller 700 and stored in a memory 704 coupled to the controller 700. The input and output signals can be logged at a rate specified by the operator of the downhole-type well testing tool 112. The controller 700 can also be used to operate and control motors, pumps, valves, flow control devices or other system components associated with the well testing tool 112. Furthermore, the controller 700 can be used with the downhole-type well testing tool 112 to operate the downhole-type well testing tool 112. In some implementations, the controller 700 can be used to operate other devices, such as a topside pump, compressor, or separator in conjunction with the downhole-type well testing tool 112.

The memory 704 can store programming instructions for execution by the one or more processors 702. For example, the processors can execute programming instructions to detect a weighted RFID tag. Alternatively or in addition, the processors 702 can execute programming instructions to set a state of the uphole packer 302a and the downhole packer 302b, set a mode of the three-way valve 306, or both. A state of the uphole packer and the downhole packer can include an activated state. The state is changed in response to a presence of a first RFID tag. A mode of the three-way valve 306 is changed in response to a presence of an RFID tag. In some instances, a second RFID tag, different than the first RFID tag, can be used to change the mode of the three-way valve 306.

Figure 9:
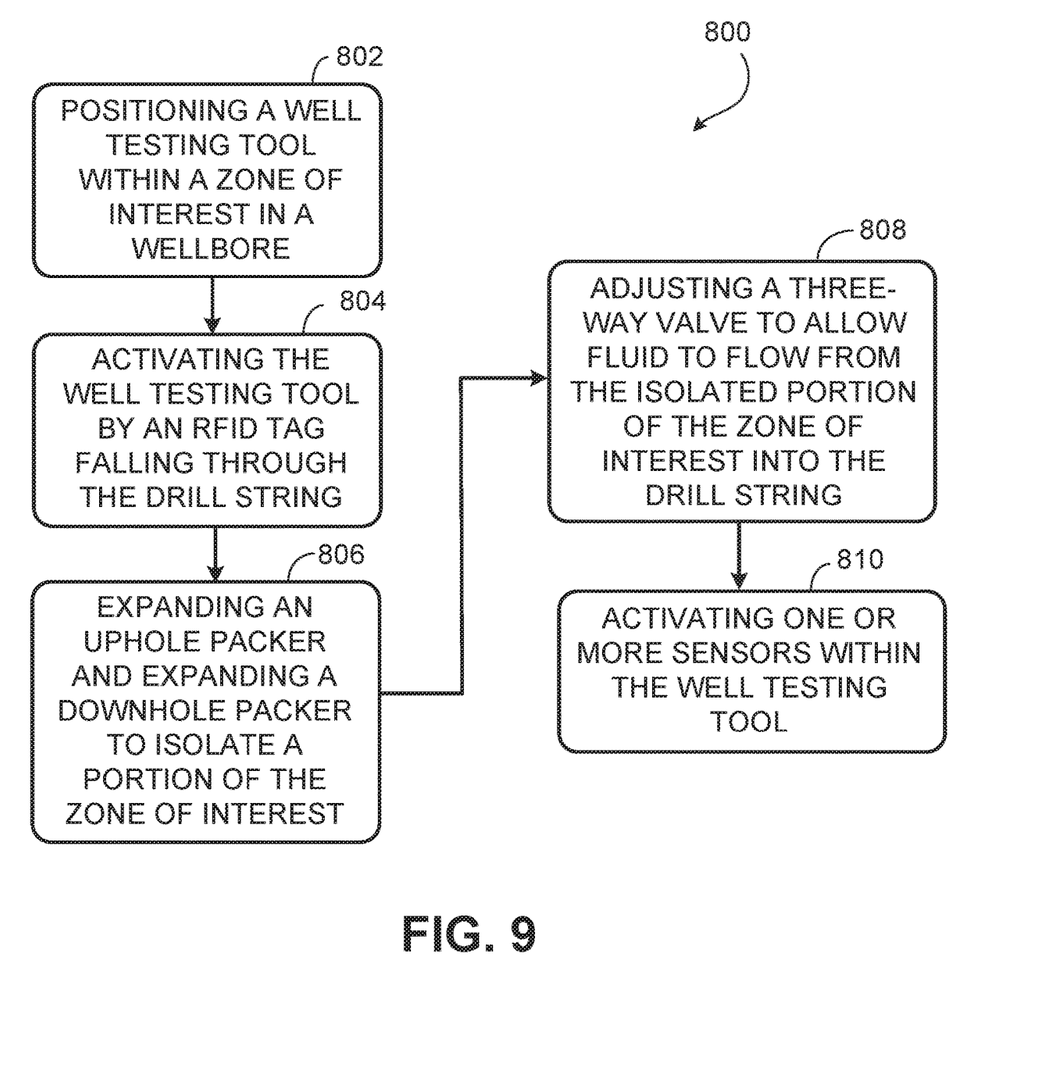
FIG. 9 is a flowchart of a well testing method.

FIG. 9 is a flowchart of a method 800 that can be used with aspects of this disclosure. At 802, a well testing tool mounted on a drill string is positioned within a zone of interest in a wellbore. At 804, the well testing tool is activated by an RFID tag with a density between four hundred to five hundred pounds per cubic foot falling through the drill string. At 806, an uphole-packer positioned at an uphole end of the well testing tool and a downhole-packer positioned at a downhole end of the well testing tool are expanded to isolate a portion of the zone of interest between the expanded uphole packer and the expanded downhole packer. At 808, a three-way valve positioned between the uphole packer and the downhole packer is adjusted to allow fluid to flow from the isolated portion of the zone of interest into the drill string. At 810, one or more sensors within the well testing tool are activated.

In some instances, production fluid from the zone of interest is flowed through the well testing tool, and up the drill string. In such an instance, the dynamic data is recorded with the one or more sensors. Recording dynamic data with one or more sensors includes recording pressure, temperature, flow-rate, or any combination. The dynamic data is relayed in real-time to a topside facility. The production fluid is flowed to the topside facility where fluid properties are further measured.

In some instances, a shut-in mode of the well testing tool is activated with a second weighted RFID tag falling through the drill string. In some implementations, the second weighted RFID tag is different from the first RFID tag. In these implementations, the second RFID tag has a signal associated with a different command than the first RFID tag. During the shut-in, dynamic data is recorded with the one or more sensors.

In some instances, the well testing tool is deactivated by a third weighted RFID chip falling through the drill string. In some configurations, the second weighted RFID tag is different from the first RFID tag and the second RFID tag. In these implementations, the third RFID tag has a signal associated with a different command than the first RFID tag and the second RFID tag. After the well testing tool is deactivated, the drill string continues drilling to a next zone of interest without tripping the well testing tool out of the wellbore.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may have been previously described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations previously described should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. While described for use in wellbore construction and reservoir testing, aspects of this invention disclosure can be applied to other industries where applicable.

What is claimed is:

1. A method comprising:
    positioning a well testing tool mounted on a drill string within a zone of interest in a wellbore;
    dropping an RFID tag with a density between 400 and 500 pounds per cubic foot through the drill string to activate the well testing tool;
    expanding an uphole packer positioned at an uphole end of the well testing tool and expanding a downhole packer positioned at a downhole end of the well testing tool to isolate a portion of the zone of interest between the expanded uphole packer and the expanded downhole packer;
    adjusting a three-way valve positioned between the uphole packer and the downhole packer to allow fluid to flow from the isolated portion of the zone of interest into the drill string, wherein the three-way valve comprises:
        a ball valve positioned within a central flow path of the well testing tool; and
        a retractable sleeve positioned downhole of the ball valve, the sleeve surrounding a plurality of fluid ports;
    activating one or more sensors within the well testing tool;
    flowing production fluid from the zone of interest, through the well testing tool, and up the drill string; and
    recording dynamic data with the one or more sensors.

2. The method of claim 1, wherein recording dynamic data with one or more sensors comprises recording pressure, temperature, or flow-rate.

3. The method of claim 1, wherein the dynamic data is relayed in real-time to a topside facility.

4. The method of claim 1, further comprising:
    flowing the production fluid to a topside facility; and
    measuring fluid properties at the topside facility.

5. The method of claim 1, further comprising: circulating circulation fluid prior to flowing production fluid, the circulation fluid being of a weight for a desired drawdown rate or underbalanced condition.

6. The method of claim 1, further comprising:
    dropping a second weighted RFID chip through the drill string to activate a shut-in mode of the well testing tool; and
    recording dynamic data with the one or more sensors.

7. The method of claim 6, further comprising: dropping a third weighted RFID chip through the drill string to deactivate the well testing tool.

8. The method of claim 7, further comprising drilling to a next zone of interest without tripping the well testing tool out of the wellbore.

9. The method of claim 1, wherein the uphole packer is a full-bore packer.

10. A downhole well testing tool comprising:
    an uphole packer positioned at an uphole end of the tool;
    a downhole packer positioned at a downhole end of the tool;
    one or more sensors positioned between the uphole packer and the downhole packer; and
    a three-way valve positioned between the uphole and downhole packer, the three-way valve comprising:
        a ball valve positioned within a central flow path of the well testing tool; and
        a retractable sleeve positioned downhole of the ball valve, the sleeve surrounding a plurality of fluid ports.

11. The downhole well testing tool of claim 10, further comprising an upper circulation valve positioned uphole of the uphole packer.

12. The downhole well testing tool of claim 10, wherein the uphole packer comprises:
    an inflatable bladder;
    a retractable protective sleeve surrounding the inflatable bladder;
    a fluid reservoir; and
    a pump fluidically coupled to the fluid reservoir and the inflatable bladder, the pump configured to flow fluid from the reservoir into the inflatable bladder.

13. The downhole well testing tool of claim 10, wherein the three-way valve has:
    an inflow mode in which the three-way valve fluidically connects a zone of interest to central flow path of the well testing tool;
    a circulating mode in which the three-way valve fluidically connects an uphole end of the tool to a downhole end of the tool; and
    a shut-in mode in which the three-way valve fluidically isolates a wellbore from the central flow path of the well testing tool.

14. The downhole well testing tool of claim 10, wherein the one or more sensors comprise:
    a pressure sensor;
    a flow meter; and
    a temperature sensor.

15. The downhole well testing tool of claim 10, further comprising a communication module configured to relay data collected by the one or more sensors to a topside facility in real-time.

16. The downhole well testing tool of claim 10, further comprising a controller comprising:
    one or more processors; and
    a non-transitory computer-readable storage medium coupled to the one or more processors and storing programming instructions for execution by the one or more processors, the programming instructions instruct the one or more processors to:
        detect a weighted RFID tag;
        set a state of the uphole packer and the downhole packer; and
        set a mode of the three-way valve.

17. A drill string comprising:
    a drill bit at a downhole end of the drill string;
    a downhole well testing tool uphole of the drill bit, the downhole well testing tool comprising:

an uphole packer positioned at an uphole end of the tool;
a downhole packer positioned at a downhole end of the tool;
one or more sensors positioned between the uphole packer and the downhole packer;
a three-way valve positioned between the uphole and downhole packer, the three-way valve configurable to be in three valve states, the three-way valve comprising:
  a ball valve positioned within a central flow path of the well testing tool; and
  a retractable sleeve positioned downhole of the ball valve, the sleeve surrounding a plurality of fluid ports; and
an upper circulation valve positioned uphole of the uphole packer, the upper circulation valve configurable to be in an open or closed state; and
a controller comprising:
  one or more processors; and
  a non-transitory computer-readable storage medium coupled to the one or more processors and storing programming instructions for execution by the one or more processors, the programming instructions instruct the one or more processors to:
  detect a first weighted RFID tag;
  set a state of the uphole packer and the downhole packer in response to the detected RFID tag; and
  set a mode of the three-way valve, wherein the mode of the three-way valve is changed in response to a presence of a second RFID tag different than the first RFID tag.

18. The drill string of claim 17, wherein the programming instructions further instruct the one or more processors to open or close the upper circulation valve.

19. The drill string of claim 17, wherein a state of the uphole packer and the downhole packer includes an activated state, the state being changed in response to a presence of a first RFID tag.

* * * * *